United States Patent
Janardhanan et al.

(10) Patent No.: US 9,059,930 B2
(45) Date of Patent: Jun. 16, 2015

(54) TECHNIQUES FOR MANAGEMENT OF DATA FORWARDING SYSTEMS WHILE SUPPRESSING LOOPS IN TELECOMMUNICATIONS NETWORKS

(71) Applicant: DELL PRODUCTS L.P., Round Rock, TX (US)

(72) Inventors: Pathangi N. Janardhanan, Chennai (IN); Mukesh Moopath Velayudhan, Fremont, CA (US)

(73) Assignee: Dell Products L.P., Round Rock, TX (US)

( * ) Notice: Subject to any disclaimer, the term of this patent is extended or adjusted under 35 U.S.C. 154(b) by 227 days.

(21) Appl. No.: 13/794,229

(22) Filed: Mar. 11, 2013

(65) Prior Publication Data

US 2014/0254604 A1    Sep. 11, 2014

(51) Int. Cl.
| | | |
|---|---|---|
| G01R 31/08 | (2006.01) | |
| G06F 11/00 | (2006.01) | |
| H04L 12/705 | (2013.01) | |
| H04L 12/721 | (2013.01) | |
| G08C 15/00 | (2006.01) | |
| H04L 12/741 | (2013.01) | |

(52) U.S. Cl.
CPC ........... *H04L 45/18* (2013.01); *H04L 45/12* (2013.01); *H04L 45/74* (2013.01); *H04L 45/66* (2013.01)

(58) Field of Classification Search
CPC .......... H04L 45/12; H04L 45/18; H04L 45/74
USPC .......................................... 370/255, 256, 401
See application file for complete search history.

(56) References Cited

U.S. PATENT DOCUMENTS

| | | | |
|---|---|---|---|
| 5,535,257 A * | 7/1996 | Goldberg et al. | 340/7.3 |
| 6,304,575 B1 | 10/2001 | Carroll et al. | |
| 7,200,144 B2 * | 4/2007 | Terrell et al. | 370/389 |
| 7,430,164 B2 * | 9/2008 | Bare | 370/217 |
| 2006/0272859 A1 * | 12/2006 | Pastusek et al. | 175/40 |
| 2007/0272442 A1 * | 11/2007 | Pastusek et al. | 175/40 |
| 2008/0008202 A1 * | 1/2008 | Terrell et al. | 370/401 |
| 2011/0292833 A1 | 12/2011 | Kapitany et al. | |
| 2012/0257539 A1 | 10/2012 | Kugel et al. | |
| 2012/0275297 A1 | 11/2012 | Subramanian | |
| 2014/0036924 A1 * | 2/2014 | Christenson | 370/395.53 |

OTHER PUBLICATIONS

Spanning Tree Protocol, no later than Jan. 11, 2013, 8 pages total, http://en.wikipedia.org/wiki/Spanning_tree_protocol.

IEEE Standards 802.1D, IEEE Standard for Local and metropolitan area networks, Media Access Control (MAC) Bridges, Jun. 9, 2004, 269 pages total.

Introducing Rapid Spanning Tree Protocol, no later than Jan. 11, 2013, 6 pages total http://etutorials.org/Networking/Lan+switching+fundamentals/Chapter+10.+Implementing+and+Tuning+Spanning+Tree/Introducing+Rapid+Spanning+Tree+Protocol/.

(Continued)

*Primary Examiner* — Farah Faroul
(74) *Attorney, Agent, or Firm* — Haynes and Boone, LLP (57) ABSTRACT

In a telecommunications network, loops are eliminated by deactivation of ports of data forwarding systems (130). When a port becomes active, topology change notifications are sent, and forwarding databases (204, 220) may have to be flushed. In some embodiments, a port may become active faster, without flushing and without topology change notifications. Other features and embodiments are also provided.

20 Claims, 8 Drawing Sheets

(56) References Cited

OTHER PUBLICATIONS

VLAN Load Balancing Between Trunks Using the Spanning-Tree Protocol Port Priority, no later than Jan. 11, 2013, 7 pages total, http://www.cisco.com/en/US/tech/tk389/tk621/technologies_tech_note09186a00800ae96a.shtml.
Understanding Rapid Spanning Tree Protocol (802.1w), no later than Jan. 11, 2013, 11 pages total, http://www.cisco.com/en/US/tech/tk389/tk621/technologies_white_paper09186a0080094cfa.shtml.
Contemporary Controls, Spanning Tree Protocol, Info. Sheet, The ABCs of Spanning Tree Protocol, Feb. 2006, 6 pages total.
Jain et al., Faster flushing with few addresses, Rev. 1.0, Jan. 7, 1999.
Understanding Spanning-Tree Protocol Topology Changes, Document ID: 12013.
A. S. Tanenbaum, Computer Networks, 4th ed. 2003, section 4.7, pp. 317-336.

* cited by examiner

TECHNIQUES FOR MANAGEMENT OF DATA FORWARDING SYSTEMS WHILE SUPPRESSING LOOPS IN TELECOMMUNICATIONS NETWORKS

BACKGROUND OF THE INVENTION

The present invention relates to information handling systems (IHSs) used in telecommunications networks, and more particularly to managing data forwarding systems (e.g. bridges) while suppressing loops in telecommunications networks.

As the value and use of information continues to increase, individuals and businesses seek additional ways to process and store information. One option is an IHS. An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. IHSs may include a variety of hardware and software components that may be configured to process, store, and communicate information and may include one or more computer systems, data storage systems, and networking systems, such as a data forwarding system.

Figure 1:
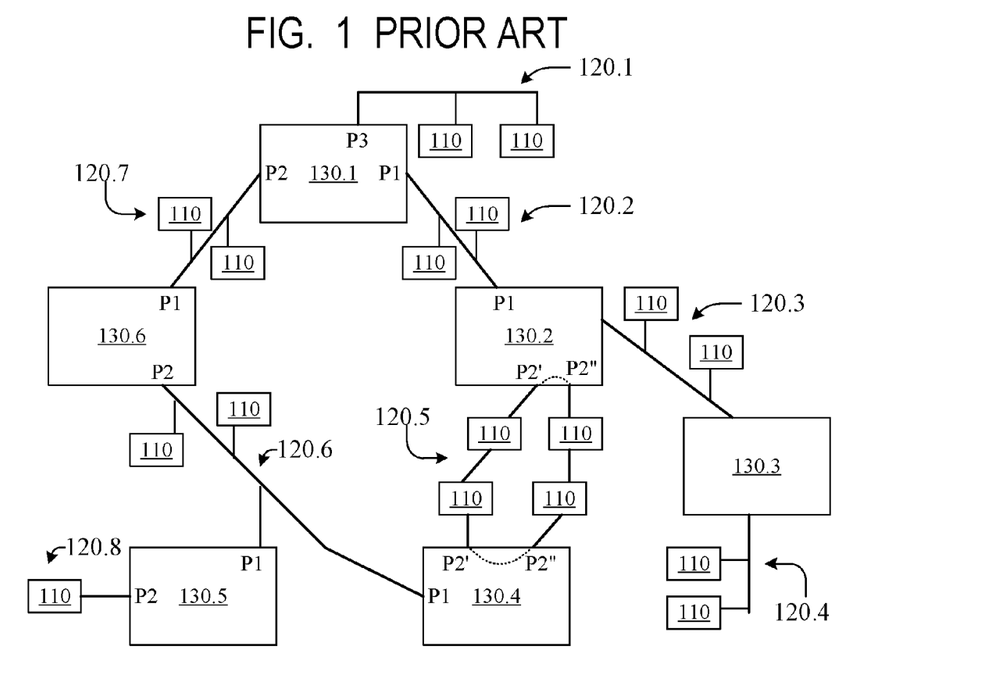
FIG. 1 is a block diagram of a Local Area Network (LAN) according to prior art.

FIG. 1 is a block diagram of a Local Area Network (LAN) which is a type of a telecommunications network. The LAN interconnects a number of stations 110 which can be computers, printers, or other types of stations. The LAN is segmented into LAN segments 120.1, 120.2, . . . interconnected by data forwarding systems 130. In this example, each data forwarding system is a bridge. Each LAN segment 120.x is a separate LAN. Segmentation can be done for various reasons, e.g. historical (to interconnect pre-existing LAN segments into a single LAN), organizational (to allow different LAN segments to be managed by different organizations), security checking (performed by bridges), reduce collisions since different LAN segments are different collision domains, and possibly others. See e.g. A. S. Tanenbaum, Computer Networks, 4$^{th}$ ed. 2003, section 4.7, incorporated herein by reference.

When a bridge 130 receives a data frame 200 (FIG. 2), the bridge must decide on which port ("outbound port") the frame must be forwarded. These decisions are made based on the bridge's filtering database (FDB) 204 stored in the bridge's memory. Data frame 200 contains a source address 206S and a destination address 206D (sometimes called MAC addresses (MAC stands for Media Access Control) or layer-2 addresses (L2 addresses)). The FDB 204 specifies the outbound port or ports for destination address 206D. For example, for bridge 130.1, the database 204 may specify the port P2 for destination addresses on LANs 120.7 and 120.6; port P3 for destination addresses on LAN 120.1; and port P1 for other destination addresses.

The bridge will not forward a frame on a port on which the frame was received. For example, if bridge 130.1 receives a frame on port P1 and the outbound port is also P1, the bridge discards the frame. Otherwise, the bridge forwards the frame on the outbound port (unless security or other restrictions apply; see for example IEEE (Institute of Electrical and Electronic Engineers) Standard 802.1D™-2004 incorporated herein by reference; the invention is not limited to bridges complying with this standard however.)

Figure 2:
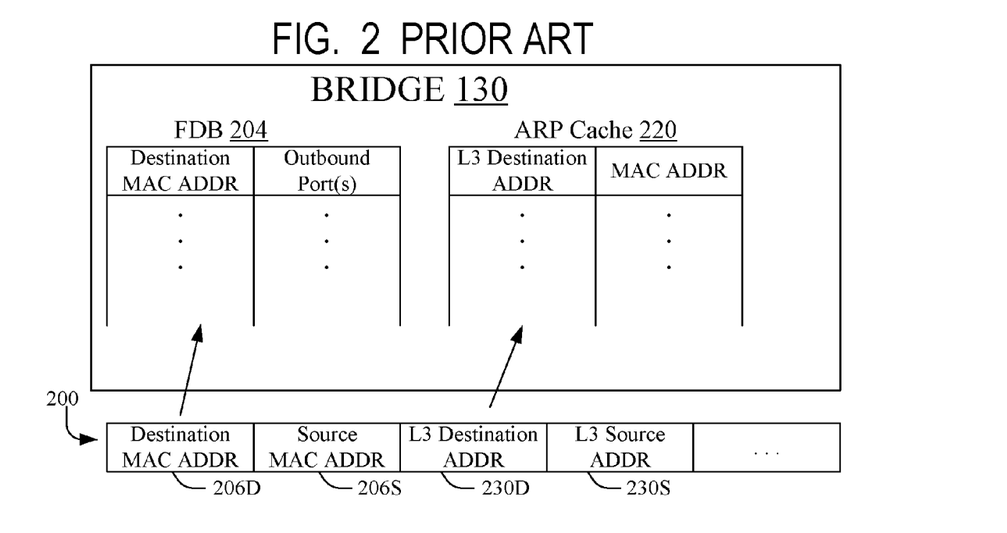
FIG. 2 is a block diagram of a data frame and of data structures in a bridge according to prior art.

If the destination address 206D is not in database 204, the bridge floods the frame, i.e. forwards the frame on all the ports except the port on which the frame was received (unless restrictions apply).

The database 204 can be populated by an administrator (a human), but can also be dynamically learned by the bridge from the data frames' source addresses. For example, if bridge 130.1 receives a data frame on port P1 with a source address having a value A1, the bridge will associate A1 with the port P1, and will enter this association into database 204. The database will show the port P1 as the outbound port for address A1. Clearly, when the LAN topology changes, e.g. stations 110 or 130 are disconnected or moved, the filtering database 204 should be flushed entirely or partially. This however leads to flooding, and hence disrupts network traffic.

A bridge may also have an ARP (Address Resolution Protocol) cache 220 (FIG. 2) for forwarding data frames for which the bridge does not have a MAC address in FDB 204, if the data frame contains a network destination address 230D (also called L3 or Layer-3 address, e.g. an IP address). As shown in FIG. 2, a data frame's layer-2 payload may include Layer-3 destination address 230D and Layer-3 source address 230S. If the data frame's MAC destination address 206D is the bridge's address, and the frame's L3 destination address 230D is present in the bridge's ARP cache 220, then the bridge will forward the frame to the corresponding MAC address in the ARP cache (unless restrictions apply). The MAC address can be looked up in FDB 204 to determine the outbound port. The MAC address may be that of the final destination (the same as identified by Layer-3 address 230D), or may be of another bridge that can forward the frame to the final destination.

The ARP cache is populated by an administrator or an automatic learning process in which the bridge may broadcast an inquiry about a layer-3 address to obtain the corresponding MAC address; the MAC address is provided by the address owner (a station 110 or bridge 130) or another bridge that can forward data frames to the layer-3 address.

To improve reliability, the LAN may include redundant paths between different LAN segments. For example, in FIG. 1, LAN segments 120.7 and 120.3 are interconnected by a path through bridges 130.1, 130.2, and by an alternate path through bridges 130.6, 130.4, 130.2. If one of these paths fails, the other path is available. However, if both paths are active at the same time, the segment 120.3 may receive duplicate copies of data frames because both bridges 130.1, 130.6 may forward the same data frame on their respective ports P1, P2, and bridge 130.4 may forward its copy of the frame further on. Also, a broadcast frame may circulate indefinitely around the LAN. Therefore, the bridges block redundant paths (i.e. eliminate "loops") by deactivating their ports as needed. (In this disclosure, we say that a loop exists if data can undesirably reach the same destination over different paths, or can circulate around the LAN; elimination of such conditions is referred to as loop elimination.)

Figure 3:
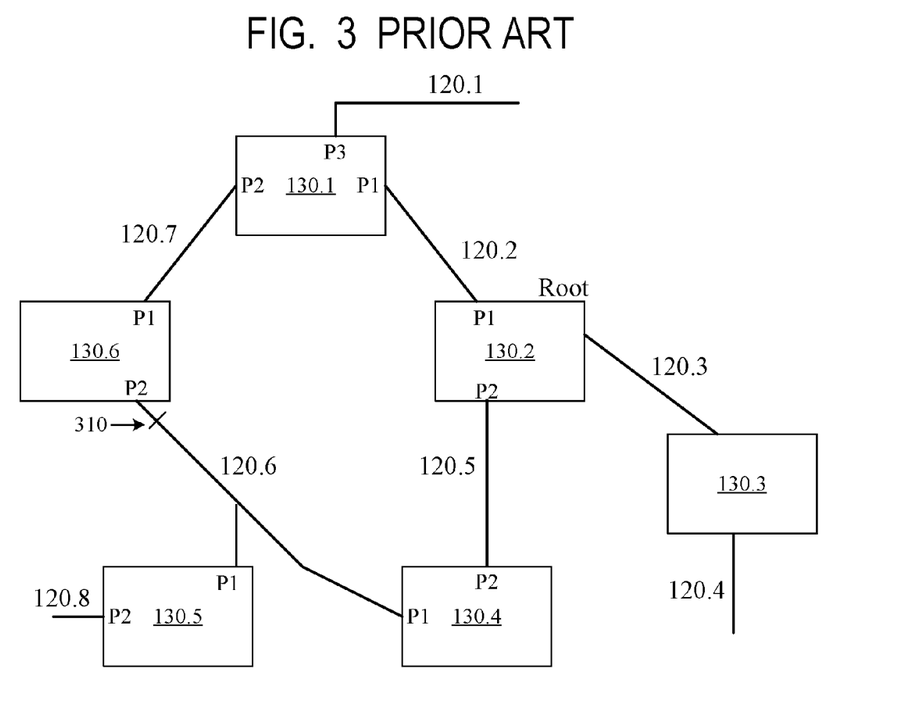
FIG. 3 is an alternate representation of the LAN of FIG. 1.

To study LAN loops (i.e. loops created in layer-2 forwarding), it is helpful to represent the LAN in a simplified form (FIG. 3), without the stations 110. Each LAN segment 120 is shown as a link between two or more bridges. (Segment 120.5 is a ring (see FIG. 1) connected to two ports P2', P2" on each bridge 130.2, 130.4; in FIG. 3, the two ports are shown as a single port P2 on each bridge.) The loops can be eliminated by bridge 130.6 deactivating its port P2, as shown by a "cut" line 310. The port P2 may or may not remain fully operational for bridge management messages (called Bridge Protocol Data Units or BPDUs in IEEE 802.1D-2004 referenced above). The bridges exchange such messages to detect loops.

An exemplary protocol for eliminating loops in LANs is Rapid Spanning Tree Protocol (RSTP) defined by IEEE 802.1D-2004 in Clause 17. Under RSTP, the bridges activate or deactivate their ports to provide a tree topology on the LAN, i.e. to eliminate loops. When a port is active, it is said to be in Forwarding State. A non-active port's state may be Discarding; in this state the port does not transmit any data other than management data, and any non-management data received on the port are discarded by the bridge. Alternatively, the port may be in Learning state: this state is similar to Discarding, but the received frames are used to populate the filtering database 204 for the port.

Initially all the ports may be Discarding except for the Edge ports, i.e. the ports not directly connected to any other bridge (such as the port P3 of bridge 130.1). The Edge ports can always be Forwarding unless they are disabled (by an administrator for example). The non-management ports exchange BPDUs to determine which ports can become Forwarding. Based on the BPDUs, one bridge is elected as the root bridge for the LAN. (In FIG. 3, bridge 130.2 is the root.) In deciding which ports should be Forwarding, priority is given to ports closest to the root (having the minimum cost of reaching the root).

The RSTP is executed continuously, so that the ports' states can change based on changes in the LAN.

FIGS. 4A-4D illustrate an exemplary network of four bridges 130.1-130.4 connected in a ring. Bridge 130.1 has been elected as the root. Link 120.1 is down or absent, so the corresponding ports P1 and P2 of bridges 130.1, 130.2 are Discarding (possibly disabled), as indicated by "D" in FIG. 4A. The remaining ports of the four bridges are Forwarding as shown by "F".

Figure 4A:
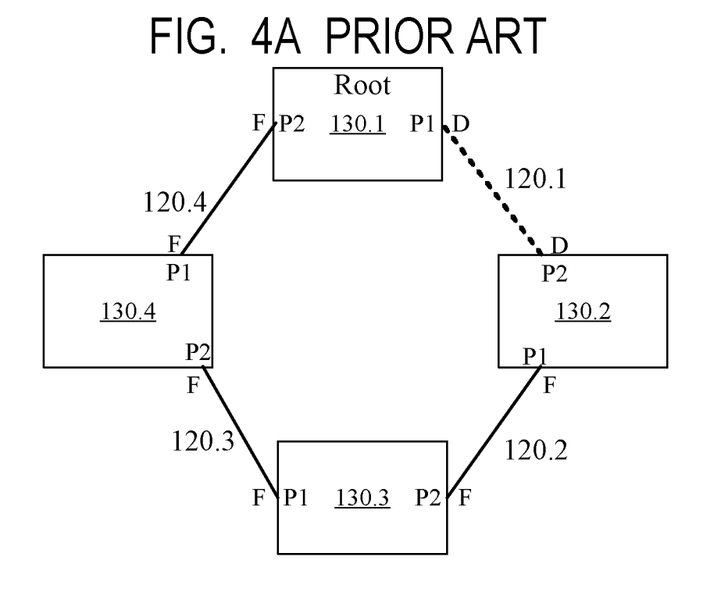
FIGS. 4A-4D illustrate execution of a spanning tree protocol in a LAN according to prior art.
Figure 4B:
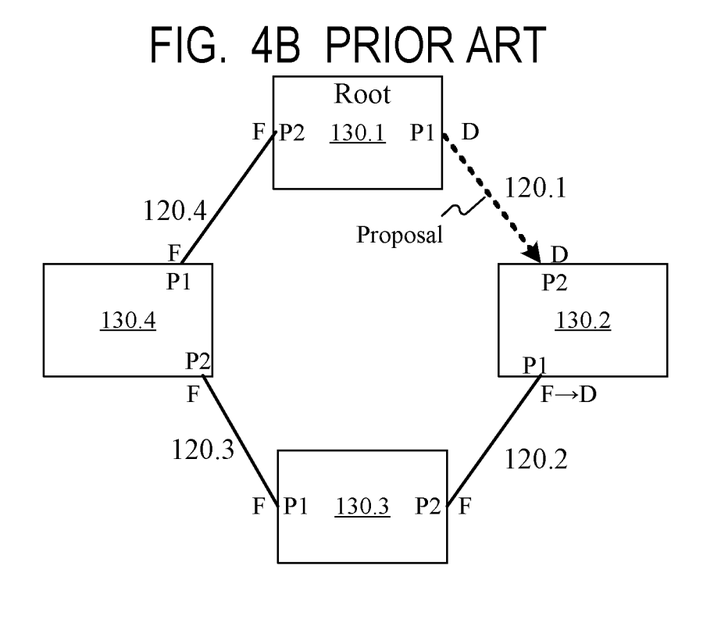

Then link 120.1 becomes operational (FIG. 4B). Root bridge 130.1 sends a "Proposal" BPDU on its port P1 to propose activation of this port. The Proposal BPDU shows the cost of reaching the root as zero.

Bridge 130.2 determines from the proposal that its port P2 has a low cost of reaching the root 130.1 and thus should be used in preference to its port P1 (connected to bridge 130.3). Before changing P2 to Forwarding, bridge 130.2 deactivates its other non-edge ports to prevent loops. In particular, the bridge's port P1 becomes Discarding (as shown by "F→D" near P1).

Figure 4C:
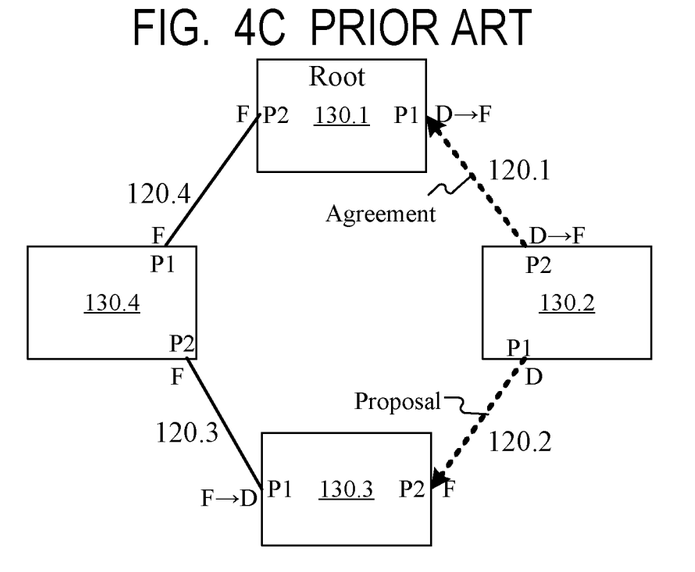

Bridge 130.2 sends an Agreement BPDU to bridge 130.1 (FIG. 4C). Bridge 130.1 changes its port P1 to Forwarding.

Bridge 130.2 sends a Proposal BPDU on its port P2 (on link 120.2) to bridge 130.3 to inform the bridge 130.3 of the topology change caused by activation of link 120.1, and also to determine if port P1 of bridge 130.2 should again become Forwarding.

Figure 4D:
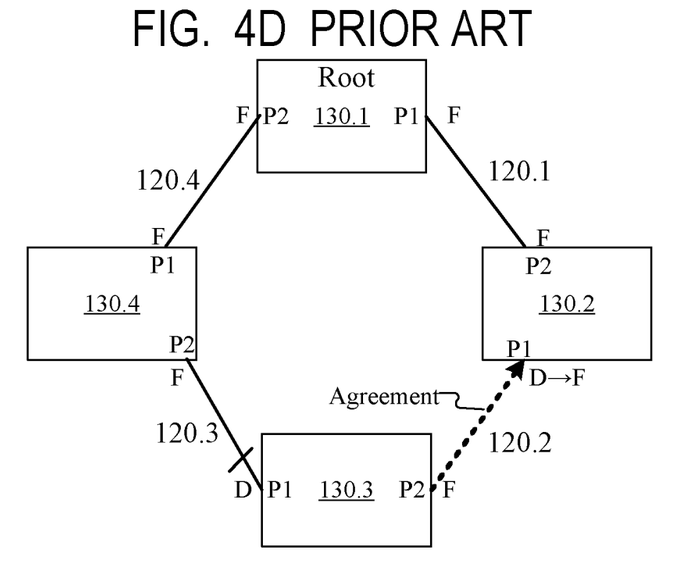

In this example, bridge 130.3 determines that its port P2 should remain Forwarding. The bridge changes its other non-edge ports (like P1) to Discarding to avoid any loops that may have been caused by the topology change. The bridge sends an Agreement BPDU to bridge 130.2 (FIG. 4D). Bridge 130.2 then changes its port P1 to Forwarding, and flushes its FDB 204 of any entries containing the port P1. The ARP cache is also flushed. The reason is as follows. In a bridge, different ports have different MAC addresses. Therefore, in the ARP cache, the MAC addresses correspond to the ports of final destinations or intermediate bridges. If the topology changes, the path to the final destination or the intermediate bridge may also change, and may terminate at a different port of the final destination or the intermediate bridge. In such a case, the MAC address in the ARP cache should change.

As shown in FIG. 4D, bridge 130.3 sends a Proposal on port P1 to bridge 130.4 over link 120.3, but bridge 130.4 rejects the Proposal. Therefore, bridge 130.3 leaves its port P1 as Discarding. Bridge 130.4 has to flush its FDB 204 of any entries containing the ports P2 and P1. The ARP cache 220 is also flushed.

Bridge 130.1 learns of the topology change and flushes its FDB 204 and ARP cache 220 of any entries related to its port P2. The port states finally stabilize after the link 120.1 activation, but the traffic will remain disrupted for a while as the bridges re-build their FDBs 204 and ARP caches 220.

Much attention has been devoted to the need to reduce flushing and speed up changing of port states to Forwarding. IEEE 802.1D-2004 specifies for example, in section 17.3, that once a port is designated as a Root port (closest to the root bridge), the Root port can transition to Forwarding state without transmitting or receiving messages from other bridges. Situations have been identified in which flushing can be eliminated or reduced. See e.g. U.S. Pre-Grant Patent Publication US 2011/0292833 (Dec. 1, 2011) and V. Jain et al., "Faster flushing with fewer addresses", Jan. 7, 1999 (discussing an older Spanning Tree Protocol), both incorporated herein by reference. Further improvements in this regard are desirable.

SUMMARY

This section summarizes some features of the invention. Other features may be described in the subsequent sections. The invention is defined by the appended claims, which are incorporated into this section by reference.

The inventors discovered new techniques for managing data forwarding systems, e.g. bridges. In particular, in some embodiments, some of these techniques allow speeding up port transitions to Forwarding state and also allow reduction of flushing.

The invention is not limited to RSPT or any particular protocol. The invention is not limited to the RSTP Forwarding state. The invention is defined by the appended claims.

DESCRIPTION OF SOME EMBODIMENTS

The embodiments described in this section illustrate but do not limit the invention. The invention is defined by the appended claims. While the invention is not limited to RSTP, some RSTP embodiments will now be described for illustration.

Figure 5:
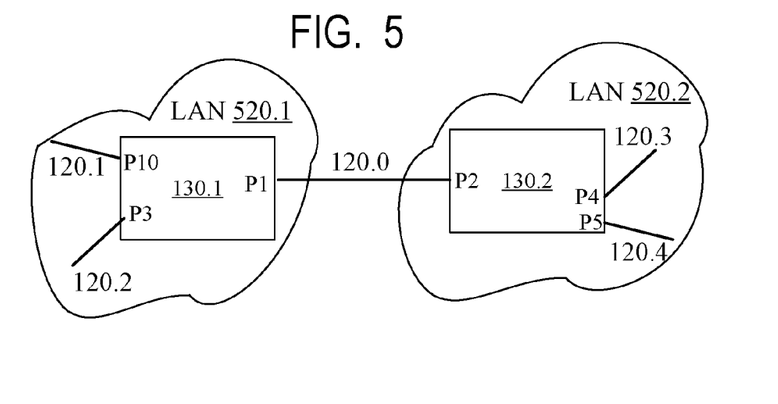
FIG. 5 is a block diagram of a LAN having a link configured according to some embodiments of the present invention.

FIG. 5 illustrates a LAN suitable for some embodiments of the present invention. The LAN contains two LANs 520.1 and 520.2 isolated from each other except for a link 120.0 which interconnects the LANs. In this illustration, the link 120.0 connects a port P1 of a bridge 130.1 of LAN 520.1 to a port P2 of a bridge 520.2 of LAN 520.2. Links 120.1 and 120.2 connect the ports P10 and P3 of bridge 130.1 to other bridges in LAN 520.1. Links 120.3 and 120.4 connect the ports P4 and P5 of bridge 130.2 to other bridges in LAN 520.2. Each of links 120.0 through 120.4 can represent a LAN segment, i.e. can be connected to non-bridge stations 110 (not shown). However, link 120.0 is not connected to any bridges other than 130.1 and 130.2, and is not connected to any bridge ports other than P1 and P2 of bridges 130.1 and 130.2. Clearly, link 120.0 cannot be part of any loop. Therefore, when any one of ports P1, P2 of respective bridges 130.1, 130.2 becomes enabled, the port can be made Forwarding right away, without the Proposal/Agreement exchange. Further, the bridges 130.1 and 130.2 do not need to change the state of their other ports, and in particular to change any other ports to Discarding. The bridges also do not need to send topology change notifications on any other ports. Also, the bridges do not perform any flushing of their FDBs 204 and ARP caches 220.

In this disclosure, links like 120.0 are called "interconnect links". More particularly, an interconnect link is a link which is connected to different bridges but cannot provide a loop for layer-2 forwarding even when the bridge ports connected to the link are in Forwarding state. Interconnect links can be automatically detected, or can be identified as such based on an administrator's configuration commands, as described below. The link's interconnect type can change (i.e. the link 120.0 can become of non-interconnect type) if it is determined, automatically or from an administrator's command, that the link provides a redundant path that can cause looping.

A loop (or Layer-2 loop or L2 loop) may exist if there is a redundant path in Layer-2 forwarding, i.e. forwarding based on the MAC destination address 206D. For RSTP purposes, there may be no loops even if LANs 520.1 and 520.2 are interconnected at higher layers, e.g. by a router (not shown) which forwards data between the two LANs based on L3 destination address 230D, or based on some other information. For example, a frame sent from LAN 520.1 to LAN 520.2 may have the MAC destination address 206D identifying the router. Such a frame will be forwarded through the router, and will not be duplicated even though the router provides a redundant path between the two LANs. Also, in some embodiments, the router will not forward L2 broadcasts, so a frame with a broadcast MAC address 206D will not be forwarded by the router and will only reach the LAN 520.2 through link 120.0.

In some embodiments, the RSTP or other loop-suppression protocol is disabled on ports P1, P2 of bridges 130.1, 130.2. In other embodiments, the loop-suppression protocol is enabled as a safety mechanism to catch misconfigurations or cabling errors as discussed below.

Figure 6:
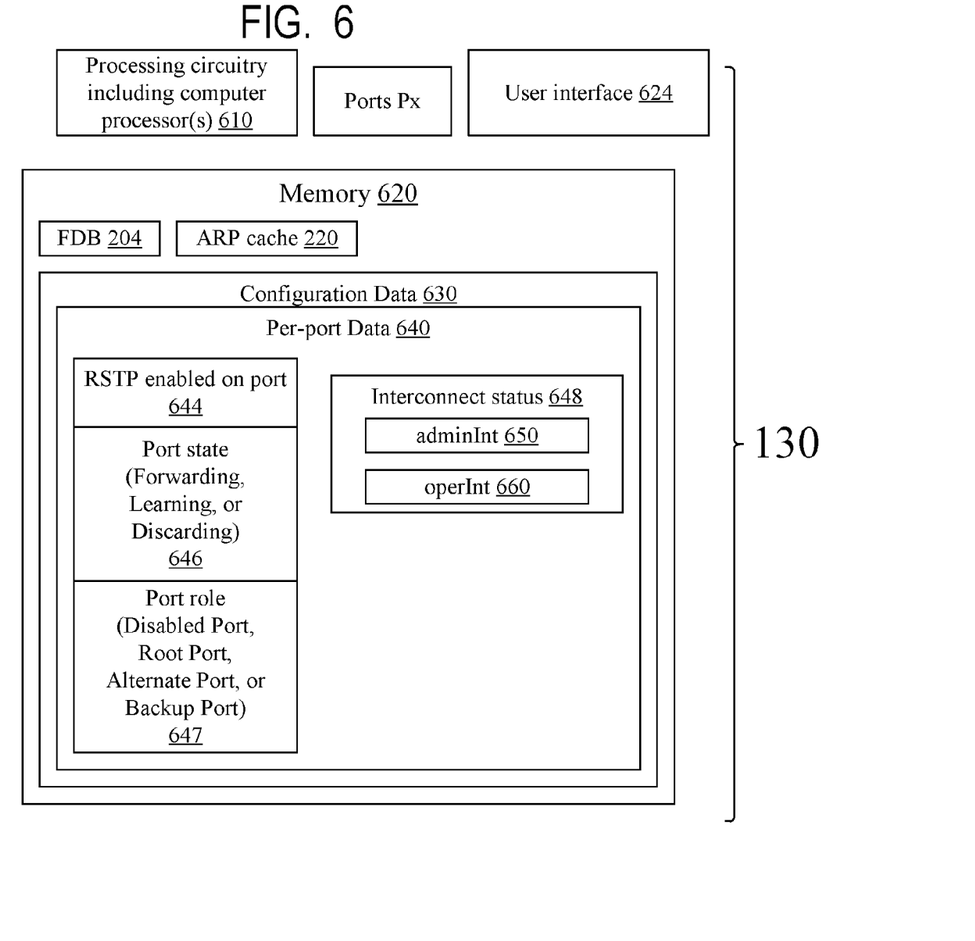
FIG. 6 is a block diagram of a bridge with data according to some embodiments of the present invention.

FIG. 6 illustrates an exemplary bridge 130 that recognizes interconnect links and thus can serve as bridge 130.1 or 130.2 in FIG. 5. Such a bridge may have a known hardware architecture, and features shown in FIG. 6 are exemplary and not limiting. The bridge of FIG. 6 includes circuitry 610 which may include one or more computer processors 610 which execute computer programs with instructions (not shown) stored in memory 620. For example, the computer programs may execute the learning algorithms described above in connection with FIG. 2, and may create and modify the FDB 204 and ARP cache 220 stored in memory 620. Circuitry 610 may also include circuits that receive, store, and forward data frames based on FDB 204 and ARP cache 220 and possibly other data. The bridge includes ports Px (such as P1, P2, etc. described above) and, possibly, user interface 624 for use by an administrator as described below. All or part of memory 620 can be integrated with circuitry 610 and/or ports Px.

Memory 220 includes configuration data 630 which define various aspects of the bridge operation. See e.g. IEEE 802.1D-2004. In particular, for each port, configuration data 630 includes per-port data 640 which define various aspects of the port operation. Per-port data 640 (or "port data" below) may include a flag 644 indicating whether a loop-suppression protocol (such as RSTP) is enabled on the port. Port data 640 may include state data 646 indicating the port's state under the protocol (Forwarding, Discarding, or Learning in RSTP). Port data 640 may also include data 647 indicating the port's RSTP role as described below, and in particular indicating whether the port is Disabled. Port data 640 may include data (not shown) indicating whether the port is an Edge port, and other data. Such data may or may not comply with IEEE 802.1D-2004.

In addition, port data 640 includes "interconnect status" data 648 indicating whether the port is determined to be connected to an interconnect link (such as 120.0; there may be multiple interconnect links in a LAN). If a port is connected to an interconnect link, we will say that the port has interconnect status, or just that the port is an interconnect port. Interconnect status data 648 can be a flag indicating whether the port is interconnect. In the example of FIG. 6, data 648 include Boolean variables (flags) adminInt 650 and operInt 660. Flag 650 (adminInt) is set by an administrator's command (issued via user interface 624 received via the LAN). Flag 660 (operInt) is set by the bridge in automatic detection of the port interconnect state (i.e. whether the port has interconnect status). In some embodiments, the port's interconnect state is defined by adminInt; the flag operInt is absent. In other embodiments, adminInt is absent, and the interconnect state is defined by operInt. In some embodiments, both flags are present, but the port's interconnect state is defined by operInt. Both flags are initialized to FALSE. Whenever adminInt is set to TRUE, operInt is also set to TRUE by the bridge. While adminInt is unchanged, operInt is determined based on the automatic detection. Other schemes are also possible to reflect the interconnect state.

In some embodiments, the interconnect state of ports P1 and P2 may be inconsistent (different from each other). This is acceptable in some embodiment. For example, if port P1 is configured as "interconnect" by data 648 on bridge 130.1, but port P2 is configured as non-interconnect on bridge 130.2, the port P1 will be made Forwarding when port P1 becomes enabled, but port P2 will not be made Forwarding without the Proposal/Agreement exchange on the two ports.

In some embodiments, the bridges 130.1 and 130.2 communicate to have the same interconnect state on ports P1 and P2. For example, if any one of the bridges 130.1 and 130.2 determines that the link 120.0 is not an interconnect link, the bridge informs the other one of the two bridges so that both ports P1 and P2 get the non-interconnect state.

Figure 7:
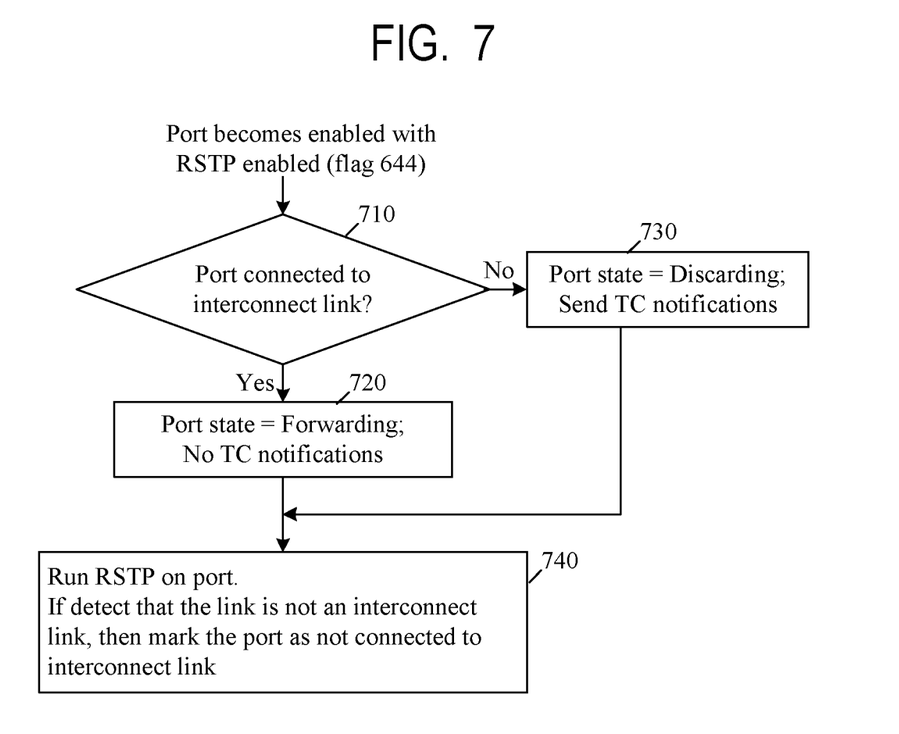
FIG. 7 is a flowchart of a loop-suppression process executed by a bridge in some embodiments of the present invention.

FIG. 7 illustrates an exemplary flowchart of the port operation. The port operation will be explained on the RSTP example, but other loop-suppression protocols can be used in similar port operation. When a port becomes enabled (as detected for example by the change in data 647), for example when the bridge is rebooted, the bridge checks whether the RSTP or other loop-suppression protocol is enabled on the port (e.g. by checking the data 644). If such a protocol is enabled, then, at step 710, the bridge checks if the port is believed to be connected to an interconnect link. In some embodiments, this is done by checking the interconnect status data 648. In some embodiments, the data 648 are stored in non-volatile memory, and thus are preserved when the bridge is rebooted.

If step 710 indicates that the port is connected to an interconnect link, the bridge makes the port state Forwarding (step 720), and does not send topology change notification on any ports. The bridge may or may not flush its FDB 204 and ARP cache 220 for the port. In some embodiments, the bridge performs no flushing with respect to any other ports. In some embodiments, the Forwarding state is provided before receiving or transmitting any data on the port.

If step 710 indicates that the port is connected to a non-interconnect link, the bridge makes the port Discarding (step 730) and sends topology change notifications on all its ports.

After performing the step 720 or 730, the bridge runs the RSTP protocol on the port (step 740). This can be any RSTP protocol, but it can be augmented by automatic detection. In particular, a Proposal/Agreement exchange could be performed.

Some automatic detection embodiments will now be described on the example of port P1 of bridge 130.1 of FIG. 5. Suppose that the bridge receives, in rapid succession, data frames having the same source MAC address 206S but arriving on different ports including the port P1 and another port (e.g. P3). If the time interval between such frames is shorter than a predefined value, the bridge will mark the port as connected to a non-interconnect link (e.g. by setting operInt to FALSE).

In other embodiments, the bridge marks the port as connected to a non-interconnect link only if such frames are broadcast frames as identified by the MAC address 206D.

Another possible test is that RSTP or other loop-suppression protocol causes the port P1 to be in a state other than Forwarding. If that happens, the bridge marks the port as connected to a non-interconnect link in some embodiments. Any one or more of these tests can be run in the alternative, i.e. the port may be marked as connected to a non-interconnect link if at least one of the one or more of these tests requires so.

The following test is also possible (the test will be explained on the RSTP example, but is not limited to RSTP). In RSTP, each port has a role, which is one of Root Port, Designated Port, Alternate Port, Backup Port, or Disabled Port. See IEEE 802.1D-2004 section 17.7. In the embodiment of FIG. 6, the role is defined by data 647. Loosely speaking, the roles are as follows:

A Disabled Port is a port disabled by an administrator or inoperational for some reason.

A Root Port is the port which, among all the enabled ports of the bridge, has the lowest cost of reaching the root bridge. The root bridge itself does not have a Root Port. A non-root bridge has a single Root Port.

A Designated Port is a port which, among all the enabled ports connected to the same link 120 on all the bridges, has the lowest cost of reaching the root bridge. Each link 120 is connected to a single Designated Port.

An Alternate Port is an alternative to the Designated Port of another bridge: if the Designated Port is changed to some other role, then an Alternate Port connected to the same link 120 can become the Designated Port for the link.

A Backup Port is an alternative to the Designated Port connected to the same link on the same bridge.

The Alternate and Backup Ports are usually Discarding. The Root and Designated ports are normally Forwarding. However, they typically become Forwarding after the Proposal/Agreement exchange explained above in connection with FIGS. 4A-4D.

Each non-root bridge determines its root port based on BPDUs exchanged with other bridges. In particular, each bridge transmits BPDUs advertising the bridge's cost of reaching the root bridge.

The automatic detection of the interconnect state can be performed as follows. If link 120.0 is an interconnect link, then one of ports P1 and P2 is the Root Port, and the other one is the Designated Port. Taking the bridge 130.1 as an example, if the port P1 is not the Root or Designated Port (as determined at step 740 for example), then the bridge configures P1 as non-interconnect (e.g. operInt is set to FALSE).

If P1 is the root port, and link 120.0 is interconnect, then the root bridge is in LAN 520.2. To check if link 120.0 is interconnect, bridge 130.1 periodically advertises, on all its ports other than P1, an artificially high cost of reaching the root bridge. The high cost may be a predefined value guaranteed to be higher than any real cost for any bridge in reaching the root bridge. The bridge 130.1 then compares this high cost with the costs received from other bridges on ports other than P1, i.e. on ports connected to LAN 520.1. If the received costs are all higher than the artificially high cost, then bridge 130.1 accepts this as an indication that the bridge 130.1 lies in all paths from LAN 520.1 to the root bridge. The bridge 130.1 then marks the port P1 as interconnect, e.g. sets operInt to TRUE. If however the bridge 130.1 gets, on a port other than P1, a lower cost of reaching the root bridge than the high cost, the bridge 130.1 marks the port P1 non-interconnect, e.g. sets operInt to FALSE. The bridge then may resume advertising the real cost on all its ports.

In some embodiments, if the port P1 is interconnect (e.g. operInt is TRUE), and is the Root Port, then the bridge continues advertising the artificially high cost on ports other than P1. The artificially high cost will help the bridge to quickly detect topology changes that create a redundant path between the two LANs 520.1, 520.2.

Similarly, if the port P1 is a Designated Port, and is interconnect, then the root bridge is in LAN 520.1. To test whether the port P1 is indeed interconnect, bridge 130.1 advertises, on P1, an artificially high cost of reaching the root bridge. If bridge 130.1 receives, on the port P1, a lower cost of reaching the root bridge, then the bridge 130.1 realizes that there is a redundant path, and the bridge 130.1 marks P1 as non-interconnect, e.g. by setting operInt to FALSE.

In some embodiments, while P1 or P2 are disabled, each LAN 520.1, 520.2 eliminates its own loops using any desired technique, e.g. RSTP. In particular, each LAN may have a separate tree with its own root bridge. When ports P1 and P2 of bridges 130.1 and 130.2 become Forwarding, the loop-suppression protocol is executed on the combined network, which includes the LANs 520.1, 520.2.

In some embodiments, any link 120, including an interconnect link 120.0, can be part of a Link Aggregation Group (LAG), i.e. a group of links connected to a logical port Px of a bridge 130 or station 110. Each logical port Px is a set of two or more member ports. Different links in the LAG are connected to respective different member ports. When a bridge must forward a frame on the port Px, the bridge forwards the frame on a single member port. For example, if ports P1, P2 in FIG. 5 are LAG ports, then bridge 130.1 will forward a data frame on just one member port of P1. The member port can be selected using a number of techniques, for example randomly, and/or using a hash of the data frame's fields, e.g. header fields, possibly including the source and destination addresses 206S, 206D, 230S, 230D. The receiving bridge 130.2 treats any frame received on a member of P2 as received on the logical port P2. Bridge 130.2 will not forward the frame on any member port of P2. Therefore, the LAG does not create loops (i.e. does not cause data replication in L2 forwarding).

In FDB 204, the outbound ports can be LAG ports, i.e. logical ports.

Figure 8:
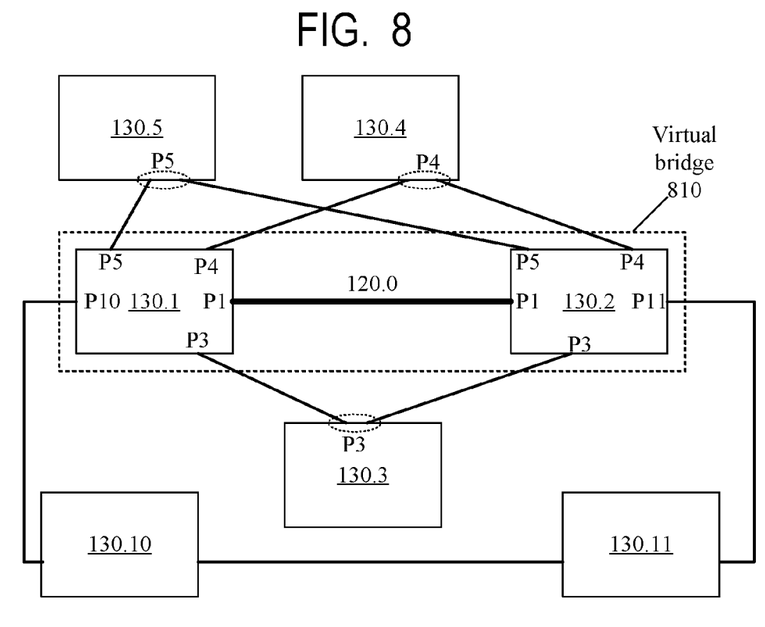
FIG. 8 is a block diagram of a LAN in which a loop-suppression process is performed according to some embodiments of the present invention.

In some embodiments, a link is treated as an interconnected link even if it connects non-isolated networks; loops are eliminated using other techniques. FIG. 8 shows an example, with bridges 130.1 and 130.2 being interconnected by a link 120.0 to form a single virtual bridge 810. For example, a virtual bridge can be an aggregation switch disclosed in the aforementioned U.S. Pre-Grant Patent Publication no. 2012/0275297; it may be a Virtual Link Trunking (VLT) switch system, with individual bridges 130.1 and 130.2 being of type S4810 available from Dell Inc. of Texas, United States.

In FIG. 8, link 120.0 is connected to ports P1 of bridges 130.1 and 130.2. The ports P3 of the two bridges are connected to a LAG port P3 of a bridge 130.3 (the port P3 is a logical port as explained above). The ports P4 of bridges 130.1 and 130.2 are connected to a LAG port P4 of bridge 130.4. The ports P5 of bridges 130.1 and 130.2 are connected to a LAG port P5 of bridge 130.5.

The ports such as P1, P2, P3 of bridges 130.1, 130.2 will be called virtual ports. More particularly, if the two bridges 130.1, 130.2 have ports connected to a common LAG port of another bridge, such ports of bridges 130.1 and 130.2 will be called virtual ports. The bridges 130.1, 130.2 may have any number of virtual ports. A virtual port may itself be a LAG port. For example, the port P3 of bridge 130.1 may be a LAG port. The ports P1 or any other ports shown may also be LAG ports.

Any one or both of bridges 130.1, 130.2 may include non-virtual ports, such as port P10 of bridge 130.1 and port P11 of bridge 130.2. The port P10 is connected to bridge 130.10, and the port P11 is connected to bridge 130.11. Bridges 130.10 and 130.11 are connected to a common link.

Bridges 130.1, 130.2 exchange learned information stored in their FDBs 204 and ARP caches 220 to reduce flooding. The exchange is performed via link 120.0.

The traffic received on link 120.0 is restricted to reduce traffic replication. More particularly, if a member bridge 130.1 or 130.2 receives a data frame on link 120.0, the bridge will not forward the data frame on any virtual port. For example, if bridge 130.2 receives a data frame on port P1, it will not forward the data frame on any port except possibly P11. Therefore, if the non-virtual ports (such as P10 and P11) are disabled, the link 120.0 does not cause looping. For loop-suppression purposes, the LAN looks essentially as in FIG. 9. In this figure, the virtual ports of bridge 130.2 are not connected to any link.

Figure 10:
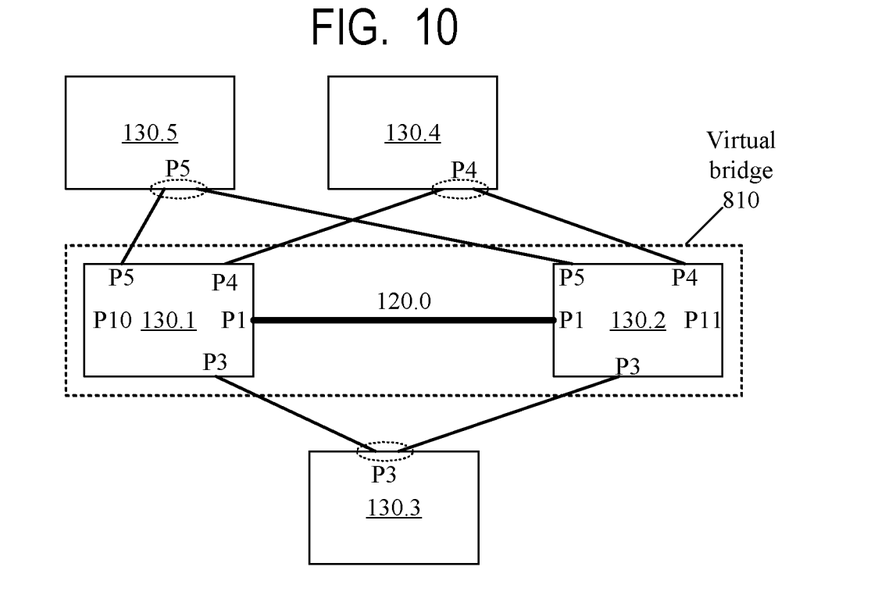
FIG. 10 is a block diagram of a LAN in which a loop-suppression process is performed according to some embodiments of the present invention.
Figure 11:
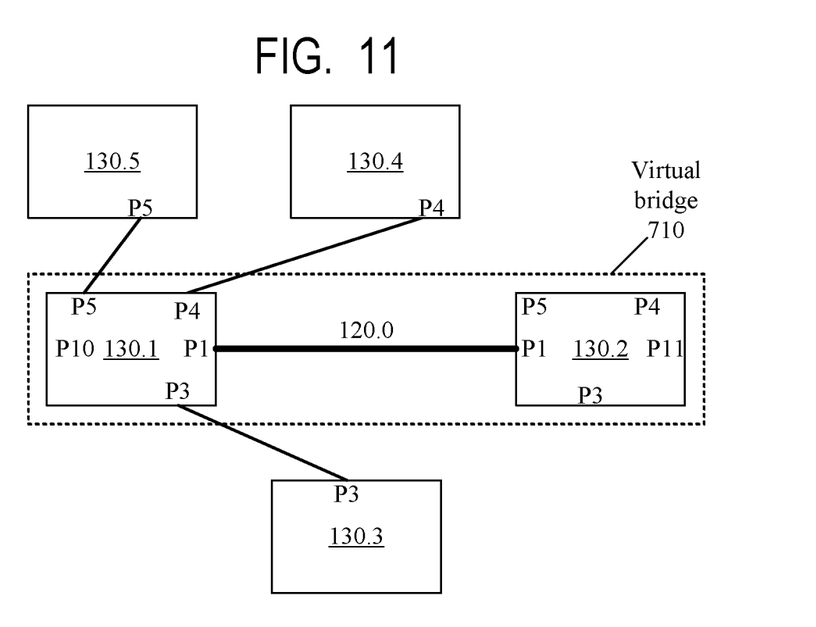
FIG. 11 is an alternate representation of the LAN of FIG. 10.

To further clarify the operation of virtual bridge 810, FIG. 10 shows the same LAN as in FIG. 8 but without bridges 130.10 and 130.11 and without any links connected to the non-virtual ports P10 and P11. For loop-suppression purposes, the LAN of FIG. 10 looks as in FIG. 11, in which the virtual ports of bridge 130.2 are not connected to any link. Clearly, the LAN of FIG. 11 has no loops.

Figure 9:
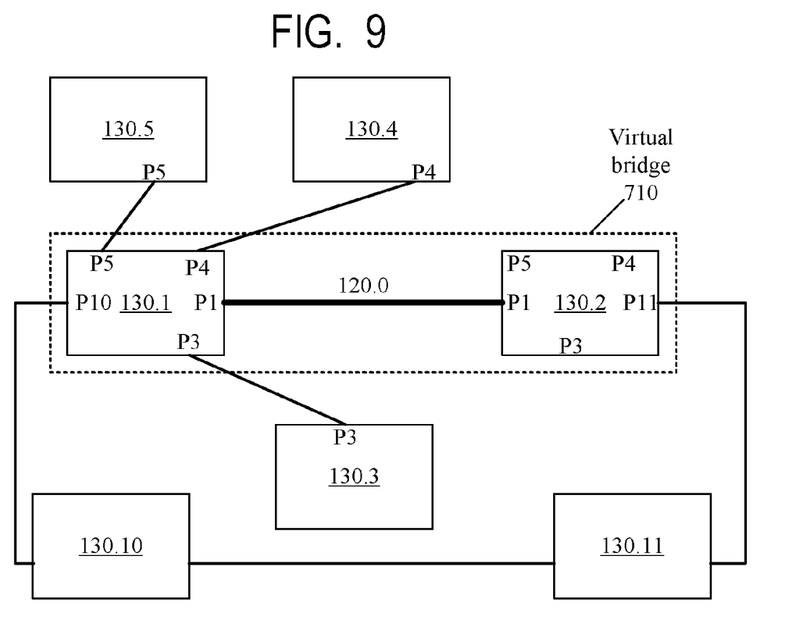
FIG. 9 is an alternate representation of the LAN of FIG. 8.

In some embodiments, the loop-suppression protocol (such as RSTP) is executed as if the LAN were as in FIG. 9. More particularly, one of the member bridges 130.1 and 130.2 is chosen as a "primary" bridge. The other bridge will be called secondary herein. In FIG. 9, bridge 130.1 is primary. The port roles and states of the virtual ports are determined by the primary bridge. If the secondary bridge receives any BPDUs on virtual ports, it forwards them to the primary bridge. The secondary bridge receives the roles and states of its ports from the primary bridge. The secondary bridge does not transmit any BPDUs on its virtual ports. The secondary bridge transmits BPDUs on the non-virtual ports based on the BPDUs received from the primary bridge and on the cost of link 120.0.

In some embodiments, each port P1 connected to the link 120.0 is always Forwarding unless the port is disabled, even if there are loops in the LAN. This is achieved, for example, by modifying the RSTP to disallow the ports P1 to become Alternate Ports, i.e. to always keep them as the Root or Designated Ports if they are enabled. For example, if the RSTP requires the port P1 of bridge 130.1 or 130.2 to be Alternate Port, this means that some port of the same bridge is the Root Port. In this case, the bridge changes the Root Port to Alternate, and changes the port P1 to the Root Port.

For example, on bridge 130.1, if RSTP requires the port P1 of bridge 130.1 to be Alternate, this means that RSTP requires another port (e.g. P10) of bridge 130.1 to be the Root Port, and may require the port P1 of bridge 130.2 to be the Designated Port for link 120.0. In this case, the bridge 130.1 changes its Root Port (P10) to Alternate (and the port P10's state to Discarding), and makes its port P1 the Root Port. Changing the Root Port to Alternate cuts loops in the LAN.

The ports P1 of both bridges are configured as interconnect. Both bridges, when enabled, execute the method of FIG. 7 for their ports P1 as long as the ports are not disabled. Thus, when the port P1 of bridge 130.1 or 130.2 becomes enabled (e.g. when the bridge is booted or on other conditions), the port's state becomes Forwarding without the Proposal/Agreement exchange on link 120.0, and without flushing, in accordance with FIG. 7. The RSTP is then executed normally (step 740).

In some embodiments, automatic detection is performed repeatedly at step 740 to determine whether the port P1 of bridge 130.1 or 130.2 is still interconnect. The automatic detection may include any tests described above.

In some embodiments, the following test is used, by itself, or in connection with other tests. This test will be explained on the example of bridge 130.1 (in some embodiments, both bridges use the same test; in other embodiments, different bridges use different tests; in still other embodiments, one of the bridges does not perform automatic detection, and in fact may operate according to prior art; only one of the bridges performs automatic detection). The test is: If bridge 130.1 has any non-virtual port enabled, then the link 120.0 is assumed to be a non-interconnect link, i.e. the port P1 loses its "interconnect" status. For example, if port P10 is enabled, then bridge 130.1 configures port P1 as "non-interconnect". If bridge 130.1 has only virtual ports enabled, then the port P1 is configured as interconnect.

Alternatively, the port P1 is configured as interconnect only if the bridge has no enabled ports other than virtual and/or Edge ports.

In some embodiments, the port P1 is configured as interconnect only if both bridges 130.1 and 130.2 have only virtual ports enabled, or only virtual and Edge ports enabled. Bridge 130.1 detects this condition from information, received from bridge 130.2, about ports of bridge 130.2. In some embodiments, for example, each of the two bridges sends, over link 120.0, information describing whether the bridge has any non-virtual non-Edge ports enabled. In some embodiments, each bridge sends a list of all its enabled ports to the other bridge, the list indicating for each port whether the port is virtual and whether the port is an Edge port. Each bridge then determines if any of the two bridges has an enabled port which is non-virtual and non-Edge. The bridges then configure their ports P1 as interconnect or non-interconnect based on this test alone or in combination with other tests.

Virtual system 810 may include more than two member bridges.

Some embodiments provide a method for operating an information handling system comprising a first forwarding system (e.g. a bridge 130) which is one of a plurality of forwarding systems interconnected by at least one link in a telecommunications network. The link can be a LAN segment for example. Each forwarding system comprises a plurality of ports for receiving and transmitting data, each forwarding system being operable to forward at least some data based on an address supplied with the data (e.g. based on a layer 2 address). The method comprises the first forwarding system performing operations as follows:

(1) Storing management data (e.g. configuration data 630). The management data comprise port data (e.g. 648) for a first port which is one of the ports of the first forwarding system. The port data indicates whether the first port has a first status (e.g. interconnect status). The first status denotes a port connected to a link of a first type (e.g. interconnect type). A link of the first type is a link which is connected to at least two forwarding systems but, even when each port which belongs to a forwarding system and is connected to the link is used for forwarding non-management data based on said address, the link does not provide a loop in data forwarding based on said address.

(2) The first forwarding system executes a management protocol (e.g. RSTP) for a set of one or more of the ports of the first forwarding system, the set comprising the first port, to determine whether any port in the set is to be unused for forwarding non-management data in order to eliminate or reduce loops in data forwarding based on said address, the non-management data comprising data not used for the management protocol;

(3) Executing the management protocol comprises:

(3A) when the first port becomes enabled, checking the management data;

(3B) if, in the checking, the management data satisfy one or more first conditions including the port data indicating that the first port has the first status, then performing a first procedure (e.g. 720) which includes configuring the first port as being used for forwarding the non-management data;

(3C) if the management data satisfy one or more second conditions including the port data not indicating that the first port has the first status, then not configuring the first port as being used for forwarding the non-management data before performing a second procedure (e.g. 740), wherein the second procedure comprises:

(3C-1) performing management communication on the first port (e.g. Proposal/Agreement), the management communication comprising sending and/or receiving management data on the first port;

(3C-2) based on management communication, configuring the first port as being used or unused for forwarding the non-management data.

In some embodiments, if the one or more first conditions hold in operation (3B), then after performing the first procedure, performing the second procedure (740 after 720) if the first port remains enabled.

In some embodiments, in the first procedure, the first port is configured as being used for forwarding non-management data without the first forwarding system informing any other one of the forwarding systems of any reconfiguration of any port (e.g. there is no topology change notification).

In some embodiments:

the first forwarding device is operable to store a database (e.g. FDB 204 and/or ARP cache 220) for forwarding at least non-management data;

in the first procedure, the first port is configured as being used for forwarding non-management data without the first forwarding system flushing any portion of the database;

in the second procedure, at least if the second procedure establishes that the first port is connected, by at least one said link, to another forwarding system (e.g. the first port is not an Edge port in RSTP), then the first port does not become configured as being used for forwarding non-management data without the first forwarding system flushing at least a portion of said database.

In some embodiments, the first forwarding system is configured to operate as a member of a group (e.g. virtual system 810) comprising a plurality of forwarding systems interconnected by a group link (e.g. 120.0), the first port being connected to the group link. The first forwarding system comprises one or more virtual ports, each virtual port being a port connected to a Link Aggregation Group (LAG) port of a forwarding system outside the group, the LAG port being connected to a virtual port of each member of the group. The first forwarding system does not forward, on any virtual port, any data received on the group link.

In some group embodiments, each group member (e.g. each bridge 130 in the virtual system) is not to forward, on any virtual port, any data received on the group link.

In some group embodiments, if the first port is enabled, then the first port is configured as being used for forwarding non-management data regardless of whether the first port has the first status.

In some group embodiments, the one or more first conditions comprise a condition that the first system does not have any enabled non-virtual port connected to a forwarding system outside the group.

In some group embodiments, the management data comprise information about ports of all data forwarding systems in the group, and the one or more first conditions comprise a condition that according to the management data each member system does not have any enabled non-virtual port connected to a forwarding system outside the group.

The invention also comprises forwarding systems operable to execute the above methods. The invention comprises computer readable media (e.g. disks, tapes, semiconductor memories, and possibly others) with computer instructions operable to cause a data forwarding system to perform the above methods.

The invention is not limited to the embodiments described above. Other embodiments and variations are within the scope of the invention, as defined by the appended claims.

The invention claimed is:

1. A method for operating an information handling system comprising a first forwarding system which is one of a plurality of forwarding systems interconnected by at least one link in a telecommunications network, each forwarding system comprising a plurality of ports for receiving and transmitting data, each forwarding system being configured to forward at least some data based on an address supplied with the data, the method comprising the first forwarding system performing operations of:

(1) storing management data, the management data comprising port data for a first port which is one of the ports of the first forwarding system, the port data indicating whether the first port has a first status, wherein the first status denotes a port connected to a link of a first type, wherein a link of the first type is a link which is connected to at least two forwarding systems but, even when each port which belongs to a forwarding system and is connected to the link is used for forwarding non-management data based on said address, the link does not provide a loop in data forwarding based on said address;

(2) executing a management protocol for a set of one or more of the ports of the first forwarding system, the set comprising the first port, to determine whether any port in the set is to be unused for forwarding non-management data in order to eliminate or reduce loops in data forwarding based on said address, the non-management data comprising data not used for the management protocol;

(3) wherein executing the management protocol comprises:

(3A) when the first port becomes enabled, checking the management data;

(3B) if, in the checking, the management data satisfy one or more first conditions including the port data indicating that the first port has the first status, then performing a first procedure which includes configuring the first port as being used for forwarding the non-management data;

(3C) if the management data satisfy one or more second conditions including the port data not indicating that the first port has the first status, then not configuring the first port as being used for forwarding the non-management data before performing a second procedure, wherein the second procedure comprises:

(3C-1) performing management communication on the first port, the management communication comprising sending and/or receiving management data on the first port;

(3C-2) based on management communication, configuring the first port as being used or unused for forwarding the non-management data.

2. The method of claim 1 wherein if the one or more first conditions hold in operation (3B), then the method comprises, after performing the first procedure, performing the second procedure if the first port remains enabled.

3. The method of claim 1 wherein in the first procedure, the first port is configured as being used for forwarding non-management data without the first forwarding system informing any other one of the forwarding systems of any reconfiguration of any port.

4. The method of claim 1 wherein:
the first forwarding system is configured to store a database for forwarding at least non-management data;
in the first procedure, the first port is configured as being used for forwarding non-management data without the first forwarding system flushing any portion of the database;
in the second procedure, at least if the second procedure establishes that the first port is connected, by at least one said link, to another forwarding system, then the first port does not become configured as being used for forwarding non-management data without the first forwarding system flushing at least a portion of said database.

5. The method of claim 1 wherein the first forwarding system is configured to operate as a member of a group comprising a plurality of forwarding systems interconnected by a group link, the first port being connected to the group link;
wherein the first forwarding system comprises one or more virtual ports, each virtual port being a port connected to a Link Aggregation Group (LAG) port of a forwarding system outside the group, the LAG port being connected to a virtual port of each member of the group;
wherein the first forwarding system does not forward, on any virtual port, any data received on the group link.

6. The method of claim 5 wherein each group member is not to forward, on any virtual port, any data received on the group link.

7. The method of claim 5 wherein if the first port is enabled, then the first port is configured as being used for forwarding non-management data regardless of whether the first port has the first status.

8. The method of claim 5 wherein the one or more first conditions comprise a condition that the first forwarding system does not have any enabled non-virtual port connected to a forwarding system outside the group.

9. The method of claim 8 wherein the management data comprise information about ports of all data forwarding systems in the group, and the one or more first conditions comprise a condition that according to the management data each member system does not have any enabled non-virtual port connected to a forwarding system outside the group.

10. A first forwarding system comprising a plurality of ports for receiving and transmitting data, the first data forwarding system being configured to perform a method for operating an information handling system comprising the first forwarding system which is one of a plurality of forwarding systems interconnected by at least one link in a telecommunications network, each forwarding system comprising a plurality of ports for receiving and transmitting data, each forwarding system being configured to forward at least some data based on an address supplied with the data, the method comprising the first forwarding system performing operations of:

(1) storing management data, the management data comprising port data for a first port which is one of the ports of the first forwarding system, the port data indicating whether the first port has a first status, wherein the first status denotes a port connected to a link of a first type, wherein a link of the first type is a link which is connected to at least two forwarding systems but, even when each port which belongs to a forwarding system and is connected to the link is used for forwarding non-management data based on said address, the link does not provide a loop in data forwarding based on said address;

(2) executing a management protocol for a set of one or more of the ports of the first forwarding system, the set comprising the first port, to determine whether any port in the set is to be unused for forwarding non-management data in order to eliminate or reduce loops in data forwarding based on said address, the non-management data comprising data not used for the management protocol;

(3) wherein executing the management protocol comprises:

(3A) when the first port becomes enabled, checking the management data;

(3B) if, in the checking, the management data satisfy one or more first conditions including the port data indicating that the first port has the first status, then performing a first procedure which includes configuring the first port as being used for forwarding the non-management data;

(3C) if the management data satisfy one or more second conditions including the port data not indicating that the first port has the first status, then not configuring the first port as being used for forwarding the non-management data before performing a second procedure, wherein the second procedure comprises:

(3C-1) performing management communication on the first port, the management communication comprising sending and/or receiving management data on the first port;

(3C-2) based on management communication, configuring the first port as being used or unused for forwarding the non-management data.

11. The first forwarding system of claim 10 wherein in said method, if the one or more first conditions hold in operation (3B), then the method comprises, after performing the first procedure, performing the second procedure if the first port remains enabled.

12. The first forwarding system of claim 10 wherein in said method, in the first procedure, the first port is configured as being used for forwarding non-management data without the first forwarding system informing any other one of the forwarding systems of any reconfiguration of any port.

13. The first forwarding system of claim 10 wherein in said method:

the first forwarding system is configured to store a database for forwarding at least non-management data;

in the first procedure, the first port is configured as being used for forwarding non-management data without the first forwarding system flushing any portion of the database;

in the second procedure, at least if the second procedure establishes that the first port is connected, by at least one said link, to another forwarding system, then the first port does not become configured as being used for forwarding non-management data without the first forwarding system flushing at least a portion of said database.

14. The first forwarding system of claim 10 wherein the first forwarding system is configurable to operate as a member of a group comprising a plurality of forwarding systems interconnected by a group link, the first port being connected to the group link;

wherein the first forwarding system is configurable to have one or more virtual ports, each virtual port being a port connected to a Link Aggregation Group (LAG) port of a forwarding system outside the group, the LAG port being connected to a virtual port of each member of the group;

wherein the first forwarding system does not forward, on any virtual port, any data received on the group link.

15. The first forwarding system of claim 14 wherein each group member is not to forward, on any virtual port, any data received on the group link.

16. The first forwarding system of claim 14 wherein if the first port is enabled, then the first port is configured as being used for forwarding non-management data regardless of whether the first port has the first status.

17. The first forwarding system of claim 14 wherein the one or more first conditions comprise a condition that the first forwarding system does not have any enabled non-virtual port connected to a forwarding system outside the group.

18. The first forwarding system of claim 17 wherein the management data comprise information about ports of all data forwarding systems in the group, and the one or more first conditions comprise a condition that according to the management data each member system does not have any enabled non-virtual port connected to a forwarding system outside the group.

19. One or more non-transitory computer readable media comprising a computer program configured to cause a first data forwarding system to perform a method for operating an information handling system comprising the first forwarding system which is one of a plurality of forwarding systems interconnected by at least one link in a telecommunications network, each forwarding system comprising a plurality of ports for receiving and transmitting data, each forwarding system being configured to forward at least some data based on an address supplied with the data, the method comprising the first forwarding system performing operations of:

(1) storing management data, the management data comprising port data for a first port which is one of the ports of the first forwarding system, the port data indicating whether the first port has a first status, wherein the first status denotes a port connected to a link of a first type, wherein a link of the first type is a link which is connected to at least two forwarding systems but, even when each port which belongs to a forwarding system and is connected to the link is used for forwarding non-management data based on said address, the link does not provide a loop in data forwarding based on said address;

(2) executing a management protocol for a set of one or more of the ports of the first forwarding system, the set comprising the first port, to determine whether any port in the set is to be unused for forwarding non-management data in order to eliminate or reduce loops in data forwarding based on said address, the non-management data comprising data not used for the management protocol;

(3) wherein executing the management protocol comprises:

(3A) when the first port becomes enabled, checking the management data;

(3B) if, in the checking, the management data satisfy one or more first conditions including the port data indicating that the first port has the first status, then performing a first procedure which includes configuring the first port as being used for forwarding the non-management data;

(3C) if the management data satisfy one or more second conditions including the port data not indicating that the first port has the first status, then not configuring the first port as being used for forwarding the non-management data before performing a second procedure, wherein the second procedure comprises:

(3C-1) performing management communication on the first port, the management communication comprising sending and/or receiving management data on the first port;

(3C-2) based on management communication, configuring the first port as being used or unused for forwarding the non-management data.

20. The one or more non-transitory computer readable media of claim 19 wherein in the method, if the one or more first conditions hold in operation (3B), then the method comprises, after performing the first procedure, performing the second procedure if the first port remains enabled.

* * * * *